United States Patent
Lacabanne et al.

[11] Patent Number: 5,890,675
[45] Date of Patent: Apr. 6, 1999

[54] PROCESS AND DEVICE FOR DAMPING VIBRATIONS OR PREVENTING THEIR APPEARANCE IN AIRCRAFT AIRFRAMES IN TRANSONIC FLIGHT

[75] Inventors: Michel Lacabanne; Thierry Martinage, both of Toulouse, France

[73] Assignee: Aerospatiale Societe Nationale Industrielle, Paris, France

[21] Appl. No.: 838,140

[22] Filed: Apr. 15, 1997

[30] Foreign Application Priority Data

Apr. 15, 1996 [FR] France ................................. 96 04887

[51] Int. Cl.⁶ ................................ B64C 3/00; B64C 3/34
[52] U.S. Cl. .................... 244/75 A; 244/123; 244/135 R
[58] Field of Search ................... 244/75 A, 123, 244/135 R, 135 C

[56] References Cited

U.S. PATENT DOCUMENTS

| | | | |
|---|---|---|---|
| 2,038,603 | 4/1936 | Roche | 244/75 A |
| 2,586,043 | 2/1952 | Hodgson et al. | 244/75 A |
| 4,917,331 | 4/1990 | Hager et al. | 244/75 A X |
| 5,054,715 | 10/1991 | Hager et al. | 244/75 A X |
| 5,660,358 | 8/1997 | Grafwallner et al. | 244/135 CC |

FOREIGN PATENT DOCUMENTS

| | | |
|---|---|---|
| 39 35 893 | 5/1991 | Germany . |
| 40 36 708 | 5/1992 | Germany . |
| 2 162 139 | 1/1986 | United Kingdom . |
| WO 85/05425 | 12/1985 | WIPO . |

*Primary Examiner*—William Grant
*Attorney, Agent, or Firm*—Young & Thompson

[57] ABSTRACT

A process and device for damping vibrations or preventing their appearance in aircraft airframes in transonic flight. The aircraft has a fuselage carrying on each side a fixed wing (7) provided with at least one propulsion motor. At least one wing (7) is provided with an additional fixed weight (12–14) so arranged that there is more added weight on one side of the aircraft than on the other, the weight being disposed within the volume delimited by the wing (7). Different weights can be added to opposite sides of the aircraft, or all the added weight can be concentrated in one wing, the weight is as close to the end of the wing as possible, beyond the motor or outermost motor of the aircraft.

5 Claims, 4 Drawing Sheets

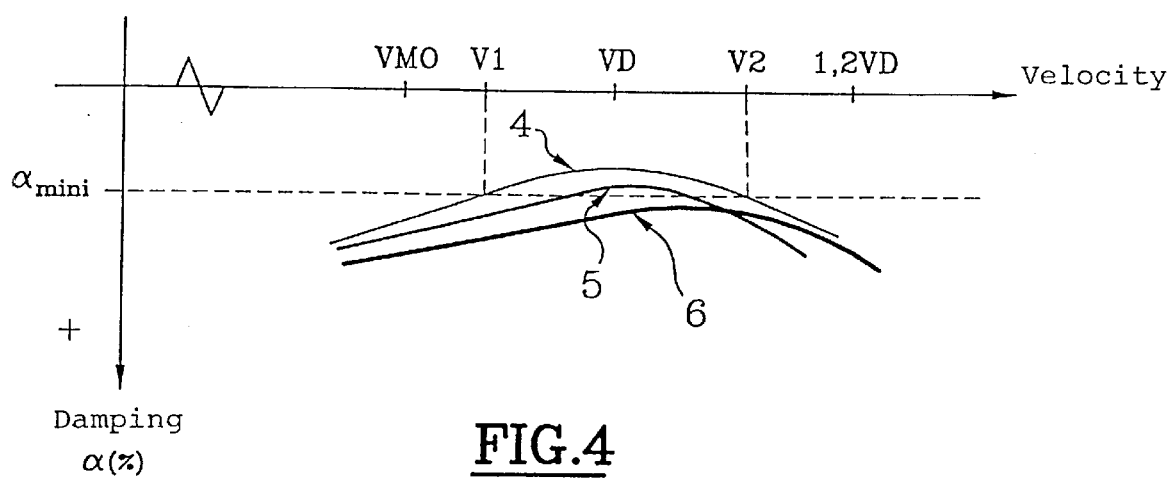
FIG.4
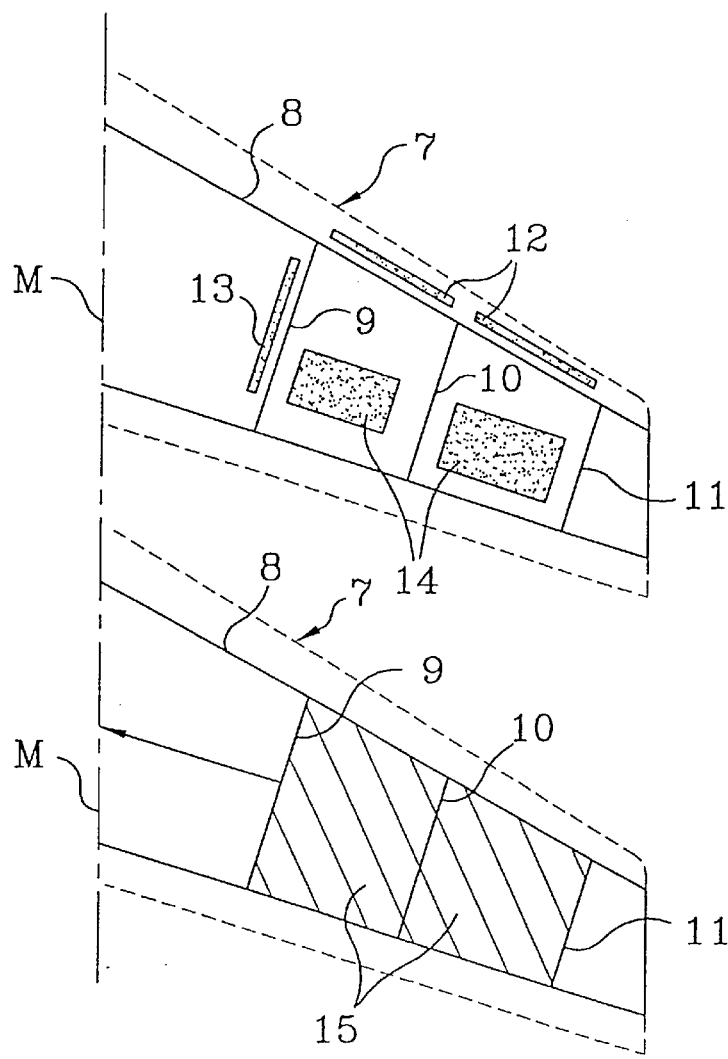
FIG.5
FIG.6

PROCESS AND DEVICE FOR DAMPING VIBRATIONS OR PREVENTING THEIR APPEARANCE IN AIRCRAFT AIRFRAMES IN TRANSONIC FLIGHT

CROSS REFERENCE TO RELATED APPLICATIONS

This application corresponds to French application 96 04887 of Apr. 15, 1996, the disclosure of which is incorporated herein by reference.

FIELD OF THE INVENTION

The invention relates to the elimination of vibrations arising from the appearance, in transonic flight, in aircraft airframes and more particularly in aircraft of the four-engine long-hull type, either of undampened divergent a oscillations constituting what is commonly called flutter, or of self-induced oscillations of limited amplitude called limit cycle oscillations.

BACKGROUND OF THE INVENTION

Conventional flutter is an unstable aeroelastic coupling between inertial elastic forces and unstable linear aerodynamic forces, which is characterized by the appearance of divergent oscillations, susceptible of rapidly growing use to destruction of the aircraft.

Limit cycle oscillation, when it is dampened, stabilizes at a certain constant amplitude adapted to affect more or less strongly the comfort of the passengers and the crew, or even the maneuverability of the aircraft, and to give rise to more or less damaging consequences for the aircraft according to the amplitudes reached and the frequencies.

Limit cycle oscillations result from a coupling of the same nature as that of conventional flutter and belong to a vibratory regime having in common with this latter the fact that it arises at a fixed frequency, generally less than 20 Hz, and more particularly in aircraft of the freight type, less than 5 Hz, this frequency depending on damping of the coupled vibration modes.

The phenomenon of limit cycle oscillation can appear in fields of flight in which there is the risk of flutter, but it can also appear in fields of flight where there is no risk of flutter. It can be explained by the existence, under conditions of transonic flight, of aerodynamic non-linearity. The phenomenon of limit cycle oscillation, under certain conditions of loading, of Mach and of speed, can appear spontaneously (without particular impetus), or as a result of turbulence or movements imposed by controls, or be caused for experimental purposes by deflection in crenelations of the ailerons.

The resulting movement, when it is established, translates into complex movements of pitching (not necessarily in phase) of the two outside motors of the four-motors, by lateral bending of these same external motors, by bending and twisting of the wings and by vertical bending of the fuselage.

It has thus been possible to determine that vertical accelerations of the front part of the fuselage reaching ±0.2 g, give rise to quite uncomfortable vibrations.

To overcome conventional flutter, recourse has already been had in the past to the addition of identical masses on each wing of a plane; it is thus well known that the installation of masses placed symmetrically in the right and left wings is effective to push back the speed limit above which appear vibrations in the structure. However, the disappearance of the divergent oscillations resulting from flutter is paid for by an increase in carried weight which is prohibitive, contrary to the requirements of greater and greater increase of the ratio of useful load to empty weight of the airplane.

SUMMARY OF THE INVENTION

The present invention has precisely for its object to dampen vibrations of aircraft airframes, arising from divergent oscillations or limit cycle oscillations under certain conditions of transonic flight, or to avoid the appearance of these vibrations, or at least to push them toward higher speeds, by providing a solution both simple and effective and less penalizing than the solutions used to the present to solve the oscillation phenomena.

To this end, the invention has for its object a process to dampen vibrations or to prevent their appearance in aircraft airframes in transonic flight, said aircraft comprising a fuselage having, on each side, a fixed wing provided with at least one propulsion motor, characterized in that it consists in providing said wing with an additional distributed fixed mass asymmetrically on opposite sides of the fuselage, said mass being disposed within a volume delimited by said wing.

According to a preferred embodiment, said mass is entirely disposed within one of the wings, right or left, of the aircraft.

Preferably, said mass will be disposed as far as possible at the end of the wing and adjacent the leading edge. It could preferably be constituted of separate elements distributed carefully within the section of the wing beyond the motor for a bimotor, or an external motor for a four-motor.

As a result of tests, it has been determined that under various conditions of flight, between Mach 0.84 and 0.86, there is obtained very good results of attenuation of vibration, by the addition on a single one of the two fixed wings of an aircraft a mass of 260 Kg.

These results are better than those obtained under the same conditions of flight and with a same aircraft, by loading each of the two fixed wings with a mass of 220 Kg, this value of mass is being moreover itself determined to be the most effective of the series of tests with symmetrical distribution of weights of different values.

It therefore follows that relative to the known solution of symmetrically adding weights, the solution according to the invention saves (2×220)−260=180 Kg and with a greater efficacy of attenuation of vibrations.

Moreover, said mass having been placed on the wing which undergoes the most severe limit cycle oscillations, the tests show surprisingly that the effects of this mass not only are beneficial for the wing thus modified, but also for the entire aircraft.

It is to be noted that the disymmetry of loading need not be total, which is to say all on one side and none on the other, but can be practiced in a less unbalanced way, which is to say a very substantial portion of the overall weight on one side and the rest on the other side, according to the type of aircraft, the conditions of flight, etc . . . .

The weight added to one or each wing, can be constituted by one or several separate elements, for example a tungsten-based alloy, of shapes and dimensions adapted to the receiving spaces.

The weight or weights in question can also be constituted, as a modification, by an on-board reservoir filled with liquid, in particular of aviation fuel. It is thus that the aircraft could carry supplemental fuel disposed selectively for example in portions of the wings beyond the external motor to constitute the weight according to the invention, the quantity in question of fuel being confined in the affected region for all the duration of a flight or used at the end of the flight outside the region of the flight in which the phenomenon of flutter or of limit cycle oscillation are likely to appear.

According to still another embodiment, there can be envisaged the local introduction at the end of the wing for example, of integrated structural reinforcements, for example thickeners of certain portions of ribs, that constitute permanently a supplemental weight without counterpart in the corresponding portion of the other wing.

It is moreover important to note that in spite of the fact that tests have been carried out in a limit cycle oscillation regime, it is to be considered that the solution provided by the invention is equally effective to damp vibrations resulting from conventional flutter.

BRIEF DESCRIPTION OF THE DRAWINGS

Other characteristics and advantages will become apparent from the description which follows, of embodiments of the process of the invention, which description is given by way of example only and with respect to the accompanying drawings, in which:

FIG. 4 is a diagram analogous to that of FIG. 3, showing the effects of symmetrical and asymmetrical weights on damping of vibrations;

FIG. 5 shows a manner of implanting separate weights, at the end of an aircraft wing;

FIG. 6 shows schematically the construction at the end of a wing of an additional weight in the form of a supplemental fuel reservoir.

DETAILED DESCRIPTION OF THE INVENTION

The phenomenon of limit cycle oscillation, under certain conditions of loading, of Mach, in particular between 0.75 and 0.95, and of speed, can appear spontaneously (without particular forces), or as the result of turbulence or of movements imposed by control surfaces, or be provoked at the end of experiment by deflection into crenelation of the ailerons.

In the whole of the aircraft, which is to say both the right and left wings, and the fuselage or empennage, auto-induced oscillations arise at fixed frequency comprised between about 2.8 and 3.0 Hz, and whose amplitude remains substantially constant with time.

The generated movements are complex pitching movements (not necessarily in phase) of the external motors, in this case of a four-engine plane, of lateral bending of these same external motors, of bending and twisting of the airfoil and of vertical bending of the fuselage, it has also been observed that the response of the aircraft to these forces is asymmetric, the end of one of the wings being more subject to vibration than the other, as well as the fuselage of which it has been observed at the front that vertical accelerations can reach ±0.2 g, which generate uncomfortable vibrations.

In addition to the effect on the comfort of the crew and the passengers,.limit cycle oscillations, if they are not dangerous for the safety of the aircraft, can nevertheless have damaging consequences and decrease the stirability of the aircraft.

Figure 1:
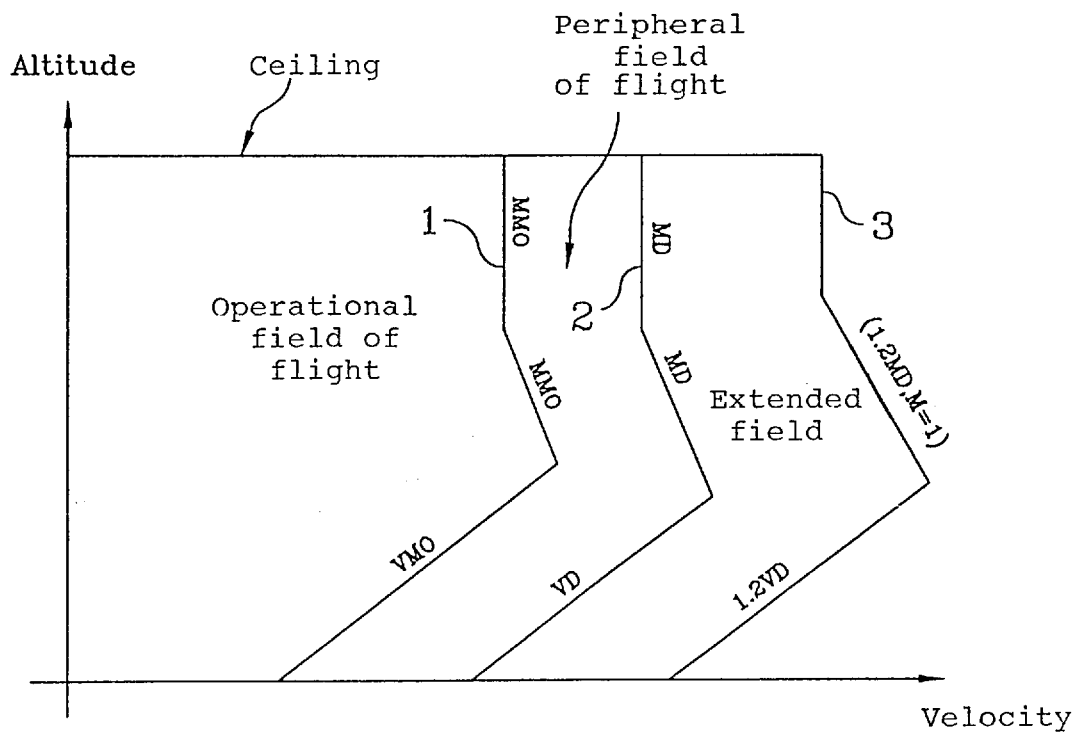
FIG. 1 is an altitude/speed diagram defining the different fields of flight of an aircraft.

For each type of aircraft, there is defined a field of normal or operational flight (FIG. 1) limited by a maximum operational speed, VMO and a maximum operational Mach MMO and a peripheral field of flight limited by a maximum speed VD and a maximum Mach MD. There is shown in FIG. 1 respectively at 1 and 2, isoMach lines for speeds VMO and VD. A maximum altitude called a ceiling, limits the altitude range.

The operational range is that in which the aircraft operates under normal operation conditions. The aircraft can operate in the peripheral range under exceptional conditions, on the occasion of exceptional maneuvers of the nose dive type for example. International regulations FAR/JAR25 require for "Large Turbine Powered Airplanes" to verify the absence of flutter or any type of excessive vibration up to VD by tests in flight, when MD is greater than or equal to 0.8. The absence of flutter must be demonstrated by analysis to 1.2 VD and 1.2 MD limited by Mach 1. There is shown in FIG. 1 such a field of flight called "extended field", delimited by the isoMach line 3 (Mach 1), within which the aircraft must not be subject to flutter.

It must also be shown that the aircraft is not subjected, up to VD, to excessive vibrations which would result in decreasing its pilotability, to increase the fatigue of the crew or to cause structural damage. According to the severity of the problem encountered and the distribution of the masses of fuel and the commercial load, the limit cycle oscillations, which can be explained by the appearance of non-linear aerodynamics, can arise in the operational field of flight or in the peripheral region. These operations can be triggered even though conventional linear analyses do not show the risk of flutter but simply cause weak dampening to happen.

Figure 2:
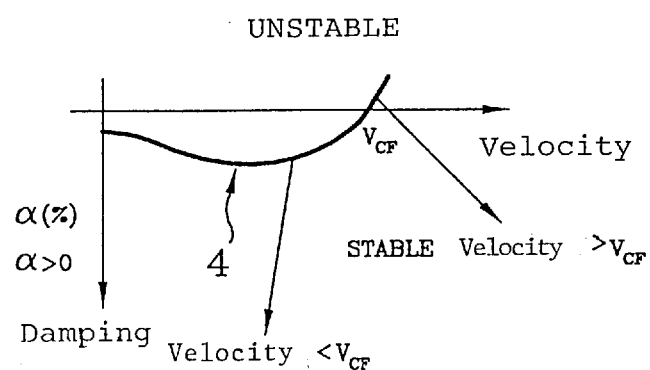
FIG. 2 is a dampening/speed diagram illustrating the phenomena of flutter.
Figure 2:
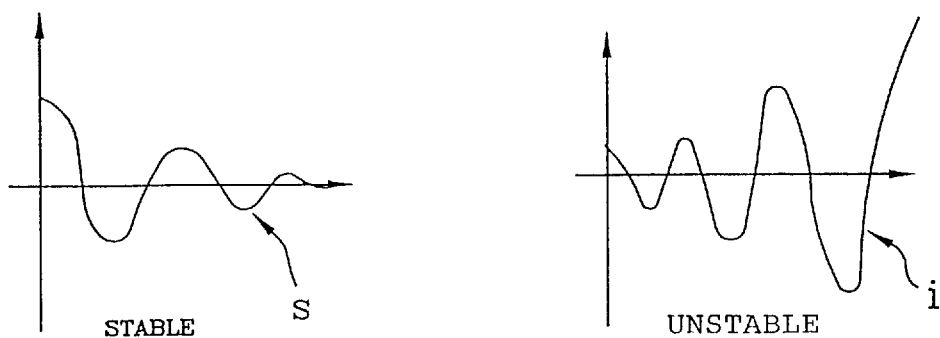

In FIG. 2, there is shown a diagram of dampening the vibrations ($\alpha$ in %) as a function of the speed of the aircraft.

The axis of speeds defines, below it (positive damping), a field of stable flight, and, above it (negative damping), an unstable field. Whilst the damping curve 4 remains in the stable field, which is to say as soon as the speed becomes less than the critical flutter speed VCF (zero dampening), if for any reason an oscillation is engendered in the airframe, there will be seen (curve s in FIG. 2), an exponential decrease of the oscillatory movement, the damping $\alpha$ being positive.

Beyond the speed VCF, the unstable region is entered shown by the curve i of FIG. 2, in which there is observed an exponential increase of the oscillatory movement, of the type $e^{-\alpha 2\pi Ft}$, F being the frequency of oscillation and t the time.

Figure 3:
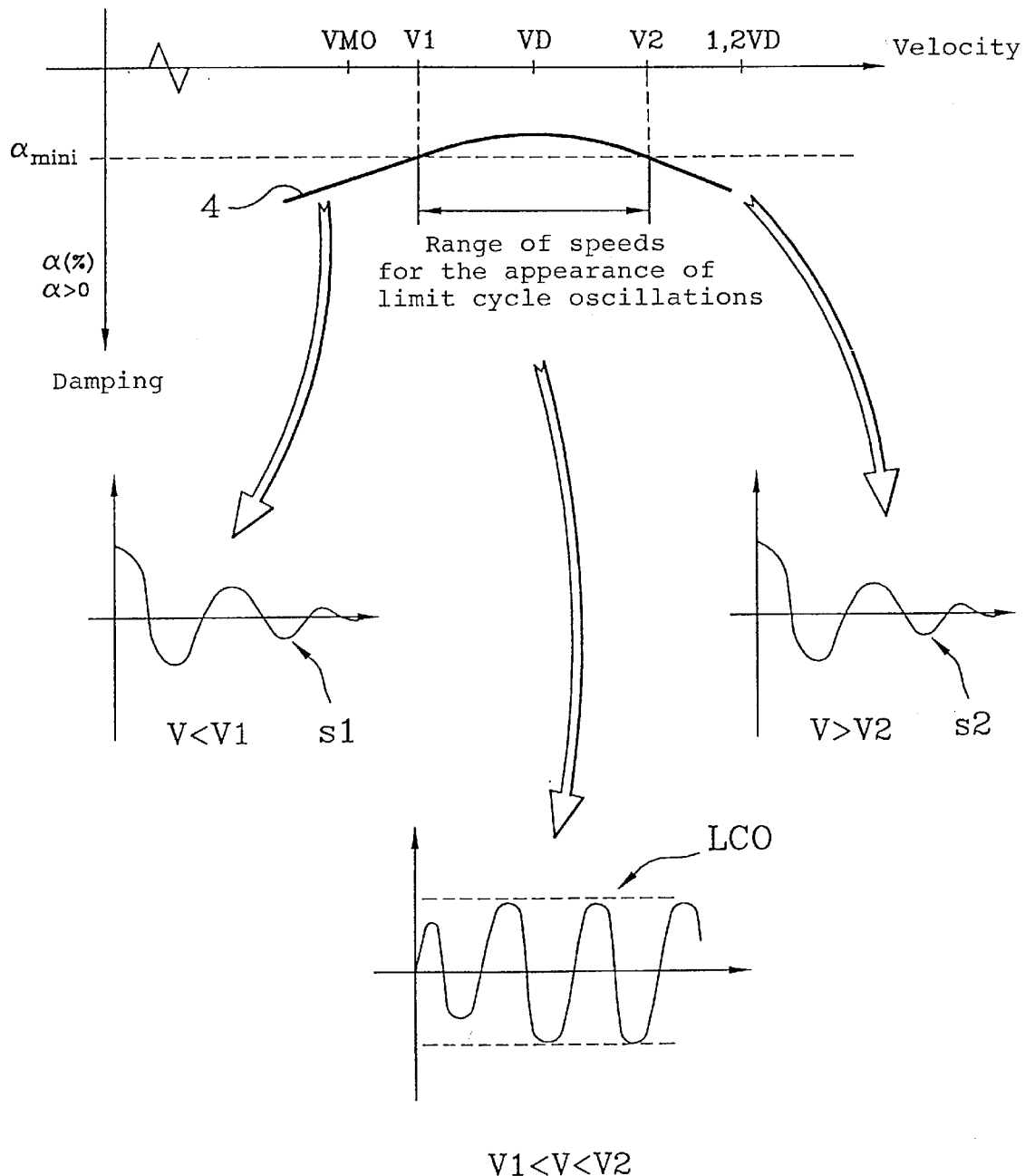
FIG. 3 is a dampening/speed diagram illustrating the phenomenon of limit cycle oscillation.

In FIG. 3, there is shown a damping curve 5 for the oscillatory movements as a function of speed, located in the stable field (positive damping $\alpha$) and in the shape of a convex segment.

If the damping is below a minimum value called $\alpha$, depending on the aeroelastic coupling, the limit cycle oscillations can be triggered, for example as a result of a force applied by deflection of the control surface, by turbulence, or spontaneously without a particular force. A mini damping value $\alpha$ of about 1% can be considered as warning limit of the risk of limit cycle oscillation, given the determination of this mini value $\alpha$ is beyond conventional aeroelastic analysis.

There is shown in FIG. 3 the top part of the curve 4, between speeds V1 and V2, corresponding to a damping lower than mini α. This portion defines a range of speeds within which can appear limit cycle oscillations such as illustrated by the curve LCO in FIG. 3.

In the example of this FIG. 3, the limit cycle oscillations are not likely to appear either at a speed lower than V1, or at a speed higher than V2. In these two extreme ranges, it will be noted as shown by the curves s1 and s2 of FIG. 3, an exponential decrease of the oscillatory movement.

On the axis of speed of FIG. 3, there are shown speeds VMO, VD and 1.2 VD. It will be noted that the maximum of speed VD is located between V1 and V2. It follows that the aircraft, when it is in the peripheral speed range, is likely to be the seat of limit cycle oscillations when its speed will be between V1 and VD. If it enters the extended range (between VD and 1.2 VD), the risks of appearance of such oscillations will disappear beyond speed V2.

To remedy this, the invention provides using the addition of a mass fixed on the airfoil which of course is not in itself new, but according to original arrangements which are seen to have in a surprising and unexpected manner entirely positive consequences, on the one hand, as to the reaction of the aircraft and, on the other hand, as to economic advantages for technical solutions previously used to eliminate or reduce the noteworthy limit cycle oscillations.

According to the invention, there is determined for each type of aircraft, more particularly aircraft of the long-haul four-engine type, a fixed mass that is to be added to the airfoil in an asymmetric manner.

FIG. 4 shows the results of such an addition of weight. It follows the curve of FIG. 3, to which have been added a curve 5 of damping corresponding to the symmetrical addition of masses, in the known manner, and a curve 6 for damping corresponding to the addition of masses according to the invention.

The curve 5 corresponds practically to a slight translation toward positive damping of the curve 4. Practically all of curve 5 is below the limit mini α, the top of the curve being very slightly above this limit. These results have been obtained by loading symmetrically each of the wings, left and right, of the aircraft, with a weight of 220 Kg.

Curve 6 corresponds to the same aircraft under the same test conditions and on which only one of the two wings has been loaded, according to the invention, the added mass being 260 Kg. It will be seen from FIG. 4 that the curve 6 is practically derived from curve 5 not only by a slight translation toward positive damping but also a slight translation toward higher speeds.

In other words, one moves even farther than the case of curve 5 from the risk zone of appearance of limit cycle oscillations (zone delimited by the corresponding dashed lines V1, V2 and mini α) and this for a total addition of a weight of 260 Kg as distinguished from 2×220=440 Kg in the case of curve 5. Moreover, the upper portion of the curve 6 nearest the mini α limit is offset substantially toward the upper limits of permitted speeds, which reinforces the margin of safety.

Damping being constantly positive, gives rise of course to a reduction of the amplitudes of the vibrations.

Thus, the comfort of the passengers is notably increased as well as the comfort of piloting the aircraft whose safety is increased because it is located in a range of flight farther from instability.

The process of the invention can be practiced in several ways.

The asymmetric characteristic of the added mass can be carried out by the arrangement, as is preferred, of all of the weight on a single side of the airfoil, left or right, with a preference for loading the side most subject to vibrations.

The asymmetry can however be carried out by an asymmetric distribution of the weight which will be divided in two unequal parts, the greater part being preferably placed on the airfoil, left or right, the most subject to vibrations.

Each weight placed on one side or the other of the fuselage can be a weight of a single block or of a weight divided into several elements, identical or not as to shape and dimensions, as a function of the place of implantation or securement.

Generally speaking, on each wing, left or right, the mass, whether monolithic or divided, will be placed as far as possible toward the end of the wing, beyond the motor, or of the external motor for a four-motored plane, and adjacent the leading edge.

FIG. 5 shows an arrangement for distribution of the weight separated into several elements disposed in various places within the volume delimited by the right wing 7 of an aircraft, for example a four-motor shown at M, the axis of the outside motor (not shown), the wing being seen from above. At 8, 9, 10 and 11 are respectively shown the front stringer and the end ribs of the wing.

Certain elements of weight 12, in the form of elongated plates, are secured on the front stringer 8.

Another element 13 of plate shape is fixed on a rib 9.

Two other elements 14, plate shaped, are disposed between the ribs 9 to 11.

The elements 12, 13, 14 are for example rectangular plates of tungsten base alloy whose geometry is appropriate to the positions of securement (by any suitable means). They have variable weights according to the type of aircraft, given that each element has a fixed weight and that the assembly comprises a mass predetermined from modeling and a series of tests in flight.

Comparative tests in flight have been carried out on a same aircraft, on the one hand, with arrangement according to the prior art technique (the same mass on each wing) and, on the other hand, with the arrangement according to the invention, the added mass being entirely on one side of the fuselage.

It has been determined that the best damping of vibrations generated by oscillations of the limit cycle oscillation, for an aircraft provided on each wing with a same additional mass, was obtained for a mass of 220 Kg on each wing, namely 440 Kg in all of added load.

As shown above with respect to FIG. 4, with an arrangement according to the invention, a damping superior to that obtained with the symmetrical distribution of weights above, has been obtained with a single added mass of 260 Kg.

In a surprising and unexpected manner, because the results according to the invention ran counter to the results obtained according to the previously-known technique of added weights identical on each wing, it has been determined that by reducing substantially the added weight, namely by passing from 440 Kg to 260 Kg in the above example, there was nevertheless obtained a substantial improvement of the damping of vibrations.

According to another unexpected result, the total disymmetric weight added to the airfoil, according to the invention, not only effectively dampens vibrations of the loaded wing, but has also an effective result on the overall reaction of the aircraft whose vibrations in other portions of the airframe have also been effectively damped.

If the best results have been obtained with all of the added weight secured on the most stressed wing (in the case of an aircraft of asymmetrical arrangement), or either one of the two wings (in the case of an aircraft of symmetrical arrangement), good results are nevertheless obtained with an added total mass divided into two unequal portions, one secured to the right wing and the other to the left wing.

It is to be noted that the additional weight to be added to the airfoil could be constituted by localized structural reinforcements, for example a localized thickening, effected upon construction of the airfoil, of constituent elements of this airfoil at the most appropriate places.

The added weight, instead of being metallic, could be constituted by a liquid, for example a fuel confined in one or several reservoirs maintained permanently filled and arranged in the most suitable places.

FIG. 6 shows in an altogether schematic manner such an arrangement, according to which an additional reservoir is disposed (cross-hatched portions) within the wing 7, between the ribs 9 to 11, and beyond the axis M of the outer motor. This reservoir 15, filled with fuel, is of course connected to the wing reservoir system of the aircraft.

The contents of the reservoir 15 constitute a supplemental quantity of fuel and can be without difficulty connected to the conventional gas tanks, said supplemental quantity being confined in the region affected during all the duration of a flight or used at the end of the flight beyond the region of flight in which are likely to appear the phenomena of flutter or limit cycle oscillation.

Figure 7:
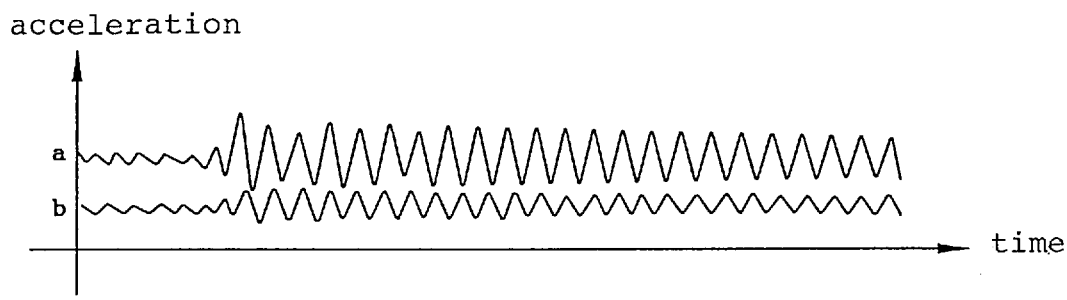
FIGS. 7 to 9 show the curves of acceleration measured during tests on an aircraft, respectively without an additional weight, with two identical symmetrical weights, and with a single weight on a single side of the airfoil.

FIG. 7 shows the consequences on vertical acceleration respectively at the end of the right wing (a) and on the front of the fuselage (b), of vibrations engendered in a test aircraft submitted to limit cycle oscillations, the flight conditions being: all tanks full of fuel, VD, MMO, the aircraft not being provided with any additional weight.

In this figure it will be observed that as soon as oscillations appear, these latter are self-generated with practically no damping.

Figure 8:
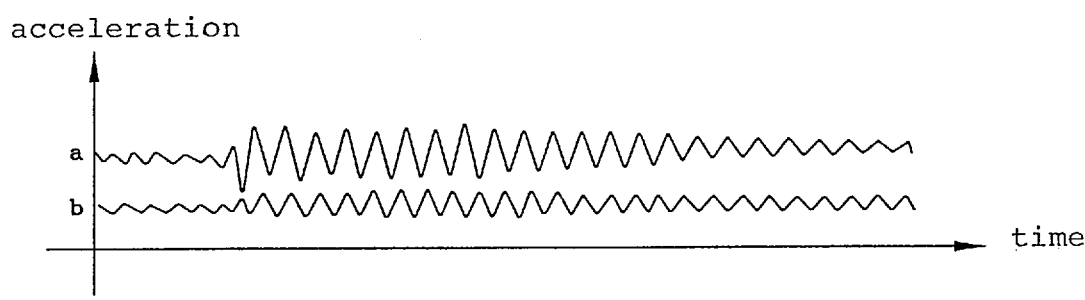

FIG. 8 corresponds to tests on the same aircraft, under the same flight conditions, but with the addition on each wing of the same mass of 220 Kg, namely 440 Kg of added weight.

It will also be noted that not only at the end of the wing (a) but also on the fuselage (b), there is a damping of the accelerations engendered by the limit cycle oscillations.

Figure 9:
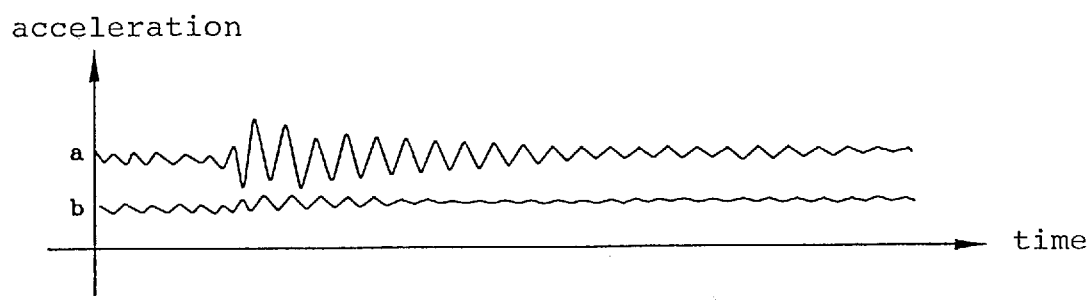

FIG. 9 corresponds to tests on the same aircraft and under the same flight conditions, but with the addition, according to the invention, of a single mass of 260 Kg at the end of the right wing.

It will be seen that the damping of accelerations, both on the wing (a) and on the fuselage (b), is very substantially faster than in the case of symmetrical weights of FIG. 8.

Generally speaking, and in short, the process of the invention permits causing the limit cycle oscillations to disappear or at least to urge them toward the peripheral region and even beyond the extended region (1.2 VD), according to the added weight in accordance with the invention.

It is also to be noted that the technical solution proposed by the invention and described above for its application to the elimination of limit cycle oscillation phenomena, is useful in the same way for divergent oscillations of the flutter type in the case in which an aircraft, thus equipped, finds itself under conditions of appearance of these phenomena.

What is claimed is:

1. In a process to dampen or prevent vibrations in aircraft airframes arising from limit cycle oscillations, said aircraft comprising a fuselage carrying a fixed right wing and a fixed left wing, each wing extending from the fuselage, each of said wings being provided with at least one propulsion motor; the improvement wherein the process comprises determining which one of the wings vibrates the most in the case of limit cycle oscillations, and disposing within the one wing which vibrates the most in the case of limit cycle oscillations at least one fixed weight distributed asymmetrically with respect to the fuselage.

2. Process according to claim 1, wherein the weight is entirely disposed within the one wing.

3. Process according to claim 1, wherein the weight is distributed in two unequal parts, each fastened to the one wing.

4. Process according to claim 1, wherein the weight is fixed on the portion of the one wing outboard of the furthest outboard motor with respect to the fuselage.

5. Process according to claim 4, wherein the weight is disposed in the proximity of the end of the one wing and adjacent a front stringer of the wing.

* * * * *